No. 751,439. PATENTED FEB. 2, 1904.
W. D. SMITH.
WATCHMAKER'S TOOL.
APPLICATION FILED OCT. 23, 1902.
NO MODEL.
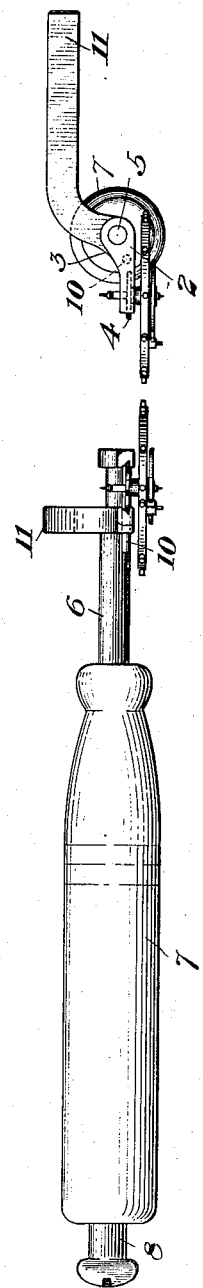
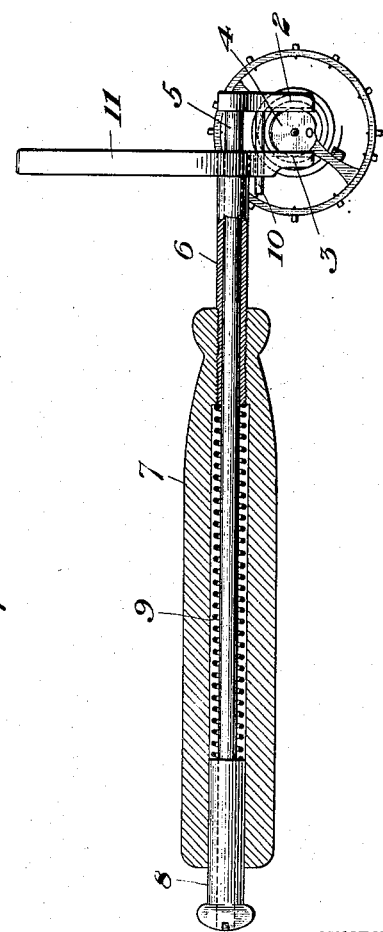
WITNESSES
INVENTOR No. 751,439. Patented February 2, 1904.

UNITED STATES PATENT OFFICE.

WILLIAM D. SMITH, OF DENVER, COLORADO.

WATCHMAKER'S TOOL.

SPECIFICATION forming part of Letters Patent No. 751,439, dated February 2, 1904.

Application filed October 23, 1902. Serial No. 128,468. (No model.)

*To all whom it may concern:*

Be it known that I, WILLIAM D. SMITH, of Denver, Arapahoe county, Colorado, have invented a new and useful Watchmaker's Tool, of which the following is a full, clear, and exact description, reference being had to the accompanying drawings, forming part of this specification, in which—

Figure 1 is a side elevation of my improved tool with a roller-table clamped therein. Fig. 2 is a top plan view of the same, partly broken away; and Fig. 3 is an end elevation.

My invention relates to watchmakers' tools, and more particularly to those employed for holding delicate points, such as the roller-table, while setting the roller-jewel and cementing it in place.

The object of the invention is to provide a simple, compact, and easily-operated tool which will prevent heating of the balance-wheel, is adjustable to different sizes of the roller-table, and will retain the roller-table firmly in position during heating of the cement.

In the drawings, 2 and 3 are clamping-jaws having grooves in their inner faces to receive the roller-table 4. The jaw 2 is secured to the outer end of a sliding rod 5, which extends through a stationary sleeve 6, carrying the other jaw, and through a handle 7 and is provided with an end stem portion 8, fitting neatly within the longitudinal hole in the handle. A spiral spring 9 surrounds the rod 5 within the handle and presses against the stem or enlarged portion 8, so as to normally draw the jaws together. In order to preserve the parallelism of the jaws in their movements, I provide a guide-rod 10, which is secured to the jaw 2 and projects through a guiding-hole in the shank of the jaw 3. This shank of the jaw 3 is provided with a rear arm or extension 11, which is adapted to be heated and conduct the heat to the roller-table.

In the use of the device the push-piece 8 of the jaw is pressed forward a sufficient distance to allow the roller-table to be placed in the grooves of the jaws. The push-piece is then released, and the angular portions of the grooves push the edges of the table down until they rest on the flat horizontal faces thereof, as shown in Fig. 1. The spring thus acts to adjust the jaws to different sizes of the table and to clamp the table in proper position. The grooves keep the tool removed from the balance-wheel, thus preventing conduction of heat from the jaws to the balance-wheel. The projecting arm 11 of the jaw 3 is then placed in the flame until the conducted heat is sufficient to melt the shellac or cement over the jewel-hole therein. As soon as the shellac is melted the operator removes the tool from the flame and inserts the roller-jewel in the hole. After straightening the jewel the operator presses on the push-piece to free the balance, the cement then hardening and holding the jewel firmly in place. The jaws are preferably made of copper to retain the heat after the device is removed from the flame, thus giving time to properly set and adjust the jewel.

The advantages of my invention result from the automatic clamping of the table by the jaws which are adjustable for different diameters. The tool is removed from the balance-wheel to prevent conduction of heat to it, and the extended arm retains the heat to allow proper adjustment after removing from the flame and before the cement is set. The grooves hold the roller-table parallel and in proper position without hand adjustment. The heat need not exceed the melting-temperature of the shellac, and there is no danger of overheating the roller-table.

The clamp may be used for holding and heating other parts—such as the pallet, in setting pallet stones or jewels, in drawing the temper in the end of staffs or pinions, or in drilling—and many changes may be made in the form and arrangement of the parts without departing from my invention.

I claim—

1. A watchmaker's tool having laterally-extending spring-actuated clamping-jaws, said jaws having longitudinal grooves arranged to clasp the edges of the part to be held; substantially as described.

2. A watchmaker's tool having extending from the body thereof laterally spring-actuated clamping-jaws, said jaws being provided with grooves to clasp the edges of the part to be held; substantially as described.

3. A watchmaker's tool having extending from one side lateral spring-actuated clamping-jaws, said jaws being provided with grooves arranged to clasp the edges of the part to be held, one of said jaws having on the other side of the tool an extension arranged to be heated and to conduct the heat to the part held in the jaws; substantially as described.

4. In a watchmaker's tool, a handle, a stationary jaw having a sleeve rigidly secured to the handle, a movable jaw provided with a stem extending through the stationary jaw and also through the handle, and a spring within the handle arranged to actuate the stem to draw the movable jaw toward the stationary jaw; substantially as described.

5. In a watchmaker's tool, a handle, a stationary jaw having a sleeve rigidly secured to the handle, a movable jaw provided with a stem extending through the stationary jaw and through the handle, and a spring within the handle surrounding the stem and arranged to actuate it to draw the movable jaw toward the stationary jaw; substantially as described.

In testimony whereof I have hereunto set my hand.

WILLIAM D. SMITH.

Witnesses:
 Thos. J. Lewis,
 Milton L. Anfenger.